US008406756B1

(12) United States Patent
Reeves et al.

(10) Patent No.: US 8,406,756 B1
(45) Date of Patent: Mar. 26, 2013

(54) WIRELESS NETWORK LOAD BALANCING AND ROAMING MANAGEMENT SYSTEM

(75) Inventors: Raymond Emilio Reeves, Olathe, KS (US); Simon Youngs, Overland Park, KS (US); Gary Duane Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 149 days.

(21) Appl. No.: 12/855,938

(22) Filed: Aug. 13, 2010

(51) Int. Cl.
H04W 4/00 (2009.01)

(52) U.S. Cl. ............... 455/432.1; 455/434; 455/453; 455/436

(58) Field of Classification Search ............ 455/406, 455/407, 408, 414.1, 432.1, 432.3, 434, 435.1, 455/405, 433, 452.1, 452.2, 452.3, 453, 454, 455/552.1, 553.1, 512, 513
See application file for complete search history.

(56) References Cited

U.S. PATENT DOCUMENTS

| | | | | |
|---|---|---|---|---|
| 5,987,062 A * | 11/1999 | Engwer et al. | ............ | 375/225 |
| 6,029,062 A | 2/2000 | Hanson | | |
| 6,185,414 B1 | 2/2001 | Brunner et al. | | |
| 6,684,072 B1 | 1/2004 | Anvekar et al. | | |
| 6,792,271 B1 | 9/2004 | Sherman et al. | | |
| 6,975,852 B1 | 12/2005 | Sofer et al. | | |
| 7,139,570 B2 | 11/2006 | Elkarat et al. | | |
| 7,173,918 B2 * | 2/2007 | Awater et al. | ............ | 370/332 |
| 7,187,928 B1 | 3/2007 | Senn et al. | | |
| 7,324,816 B2 | 1/2008 | Sherman et al. | | |
| 7,333,808 B2 | 2/2008 | Elkarat et al. | | |
| 7,599,887 B1 | 10/2009 | Short | | |
| 2004/0008672 A1 * | 1/2004 | Kobylarz et al. | ............ | 370/352 |
| 2004/0053624 A1 * | 3/2004 | Frank et al. | ............ | 455/453 |
| 2004/0192306 A1 | 9/2004 | Elkarat et al. | | |
| 2005/0020263 A1 | 1/2005 | Sherman et al. | | |
| 2005/0060319 A1 * | 3/2005 | Douglas et al. | ............ | 707/10 |
| 2006/0187873 A1 * | 8/2006 | Friday et al. | ............ | 370/328 |
| 2007/0054665 A1 | 3/2007 | Elkarat et al. | | |
| 2007/0232307 A1 * | 10/2007 | Ibrahim et al. | ............ | 455/436 |
| 2008/0070570 A1 | 3/2008 | Jiang | | |
| 2008/0076413 A1 | 3/2008 | Jones | | |
| 2008/0085707 A1 * | 4/2008 | Fadell | ............ | 455/435.3 |
| 2008/0102829 A1 | 5/2008 | Jiang | | |
| 2008/0167033 A1 * | 7/2008 | Beckers | ............ | 455/432.3 |
| 2008/0170497 A1 * | 7/2008 | Jeong et al. | ............ | 370/230 |
| 2008/0188218 A1 | 8/2008 | Sherman et al. | | |
| 2010/0234042 A1 * | 9/2010 | Chan et al. | ............ | 455/453 |
| 2010/0291924 A1 * | 11/2010 | Antrim et al. | ............ | 455/433 |
| 2010/0311468 A1 * | 12/2010 | Shi et al. | ............ | 455/558 |

* cited by examiner

Primary Examiner — Jean Gelin

(57) ABSTRACT

A roaming management computer system comprises a communication interface and a processing system. The communication interface is configured to receive loading thresholds and usage information for each of a plurality of different wireless networks. The processing system is configured to process the loading thresholds and the usage information to determine load balancing requirements for the wireless networks, and process the load balancing requirements to generate preferred roaming lists for wireless communication devices roaming in the wireless networks. The communication interface is further configured to transfer the preferred roaming lists for delivery to the wireless communication devices.

20 Claims, 5 Drawing Sheets

WIRELESS NETWORK LOAD BALANCING AND ROAMING MANAGEMENT SYSTEM

TECHNICAL BACKGROUND

To exchange user communications, a person typically operates a wireless communication device to communicate in a wireless protocol with a wireless access node. The wireless access node often exchanges the user communications with other systems of a wireless access network, such as gateways, service nodes, and mobile switching centers, to ultimately provide a communication service, such as telephony voice communications or data access over the Internet.

A wireless communication device is commonly associated with a particular wireless network, often referred to as a home wireless network. For example, a user who subscribes for a communication service from a wireless network operator may access the service using a wireless communication device homed to the wireless network operator's network. Typically, a wireless network operator does not have proprietary ownership of wireless coverage across all geographic areas where service is offered. Instead, most wireless network operators allow their associated users to access wireless communication services from partnering, visited wireless networks. This practice, termed roaming, enables users to receive wireless communication services in the largest possible geographic area. However, when a user associated with one wireless network operator roams in a visited wireless network, the wireless network operator must often pay predetermined fees to the visited wireless network operator.

Presently, a wireless network operator may configure wireless communication devices operated by its users with a preferred roaming list (PRL). The PRL provides a listing of visited wireless networks that the wireless communication devices may attempt to communicate with whenever wireless communication service cannot be provided by the home wireless network operated by the wireless network operator. The PRL is typically prioritized to assist a wireless communication device in selecting the most preferable visited wireless network for the wireless network operator while still meeting the service requirements of the user.

Overview

A method of operating a roaming management computer system for a plurality of different wireless networks is disclosed. The method comprises receiving loading thresholds for each of the wireless networks, receiving usage information for each of the wireless networks, processing the loading thresholds and the usage information to determine load balancing requirements for the wireless networks, processing the load balancing requirements to generate preferred roaming lists for wireless communication devices roaming in the wireless networks, and transferring the preferred roaming lists for delivery to the wireless communication devices.

A roaming management computer system comprises a communication interface and a processing system. The communication interface is configured to receive loading thresholds and usage information for each of a plurality of different wireless networks. The processing system is configured to process the loading thresholds and the usage information to determine load balancing requirements for the wireless networks, and process the load balancing requirements to generate preferred roaming lists for wireless communication devices roaming in the wireless networks. The communication interface is further configured to transfer the preferred roaming lists for delivery to the wireless communication devices.

Another method of operating a roaming management computer system for a plurality of different wireless networks is disclosed. The method comprises receiving loading thresholds for each of the wireless networks, receiving usage information for each of the wireless networks, wherein the usage information comprises an amount of utilization of each of the wireless networks, processing the loading thresholds and the usage information to determine load balancing requirements for the wireless networks, processing the load balancing requirements to generate preferred roaming lists for wireless communication devices roaming in the wireless networks, transferring the preferred roaming lists for delivery to the wireless communication devices, receiving roaming usage information for a wireless communication device of the wireless communication devices roaming in the wireless networks, wherein the roaming usage information comprises an amount of utilization of each of the wireless networks by the wireless communication device, processing the roaming usage information to determine whether the wireless communication device has reached a roaming threshold, and if the wireless communication device has reached the roaming threshold, transferring an updated preferred roaming list for delivery to the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
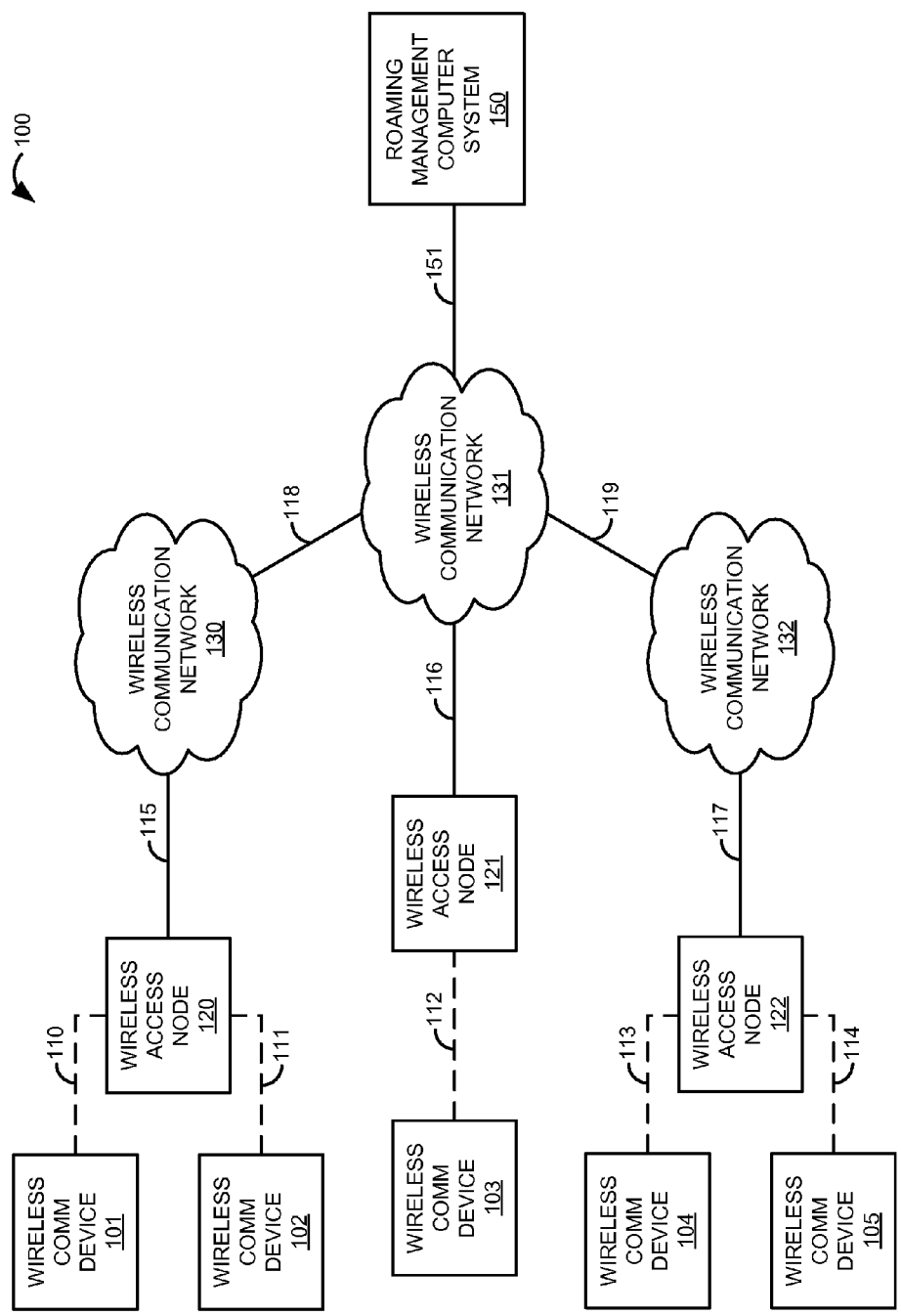
FIG. 1 is a block diagram that illustrates a communication system.

FIG. 1 is a block diagram that illustrates communication system 100. Communication system 100 includes wireless communication devices 101-105, wireless access nodes 120-122, wireless communication networks 130-132, and roaming management computer system 150. Wireless communication devices 101 and 102 are in communication with wireless access node 120 over respective wireless communication links 110 and 111. Likewise, wireless communication device 103 communicates with wireless access node 121 over wireless communication link 112, while wireless communication devices 104 and 105 are in communication with wireless access node 122 over respective wireless communication links 113 and 114. Wireless access nodes 120-122 communicate with respective wireless communication networks 130-132 over respective communication links 115-117.

Wireless communication network 130 is in communication with wireless communication network 131 over communication link 118, while wireless communication network 132 communicates with wireless communication network 131 over communication link 119. Wireless communication network 131 is in communication with roaming management computer system 150 over communication link 151.

Figure 2:
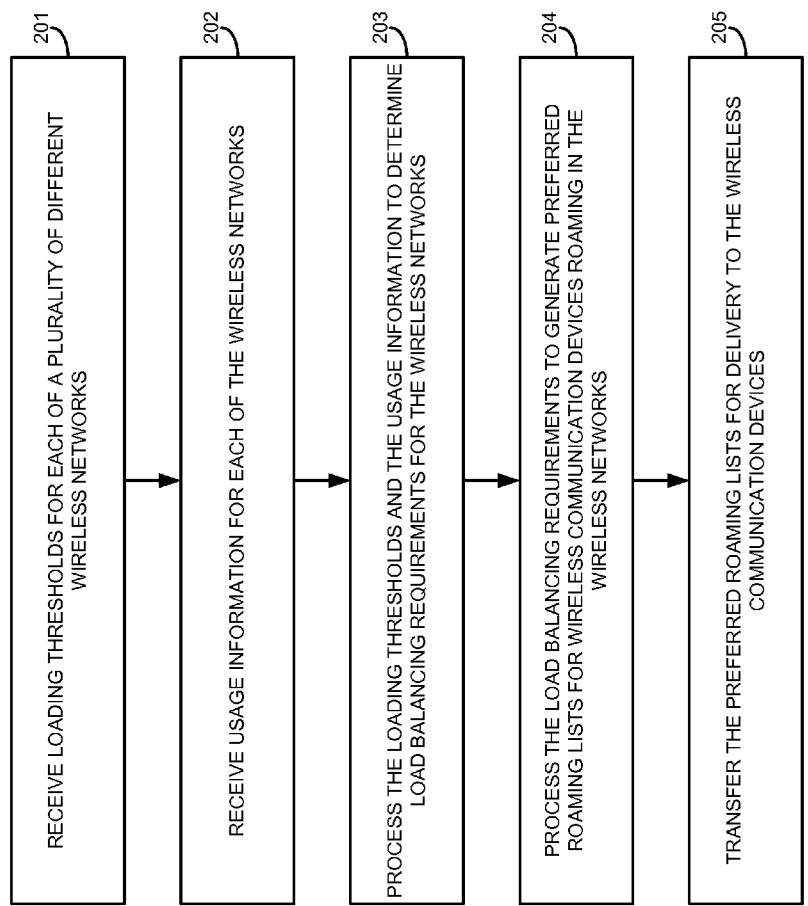
FIG. 2 is a flow diagram that illustrates an operation of the communication system.

FIG. 2 is a flow diagram that illustrates an operation of communication system 100. The steps of the operation are indicated below parenthetically. The exemplary operation shown in FIG. 2 depicts a method of operating roaming management computer system 150 for a plurality of different wireless communication networks 130-132.

To begin, roaming management computer system 150 receives loading thresholds for each of the wireless networks 130-132 (201). The loading thresholds for each of the wireless networks 130-132 typically comprise thresholds for a maximum communication loading on each of the wireless networks 130-132. The loading thresholds could comprise any value in any format, but some examples include a threshold amount of users, connections, or communication sessions, a percentage of communication loading or bandwidth utilization, or any other threshold limiting utilization of wireless networks 130-132. In some examples, the loading thresholds could also comprise an optimal loading level or a maximum loading level for each of the wireless networks 130-132. Note that the loading thresholds for each of the wireless networks 130-132 could be different depending on the capacity of each of the wireless networks 130-132, respectively. Typically, when a loading threshold for a particular wireless network 130-132 is exceeded, the wireless network 130-132 associated with that loading threshold is considered overloaded.

In addition to the loading thresholds, roaming management computer system 150 also receives usage information for each of the wireless networks 130-132 (202). The usage information for each of the wireless networks 130-132 typically comprises the actual communication loading on each of the wireless networks 130-132. In other words, the usage information comprises an amount of utilization of each of the wireless networks 130-132. Like the loading thresholds, the usage information could comprise any value in any format, but some examples include an amount of users, connections, or communication sessions, a percentage of communication loading or bandwidth utilization, or any other metric indicating utilization of wireless networks 130-132. Typically, the usage information is based on current loading levels for each of the wireless networks 130-132, but historical usage data could also be considered.

Roaming management computer system 150 then processes the loading thresholds and the usage information for each of the wireless networks 130-132 to determine load balancing requirements for the wireless networks 130-132 (203). The load balancing requirements typically dictate how the total load over all of the wireless networks 130-132 should be distributed. Roaming management computer system 150 may attempt to determine an even distribution of loading across all of the wireless networks 130-132, but in some examples the loading may not be equally balanced. In some examples, roaming management computer system 150 may determine the load balancing requirements based on bandwidth utilization levels on each of the wireless networks 130-132. For example, roaming management computer system 150 may determine the load balancing requirements by distributing more of the load to larger networks, networks with greater bandwidth, or underutilized networks. Additionally or alternatively, roaming management computer system 150 may favor certain wireless networks 130-132 over others based on a predetermined priority when determining the load balancing requirements in some examples. For example, roaming management computer system 150 may determine the load balancing requirements based on cost analysis and favor wireless networks 130-132 with the least cost.

Roaming management computer system 150 may determine the load balancing requirements in several ways. In some examples, roaming management computer system 150 may determine the load balancing requirements based on a number of wireless communication devices 101-105 roaming in the wireless networks 130-132. For example, roaming management computer system 150 may determine which wireless communication devices 101-105 are roaming in their respective wireless communication networks 130-132, and would determine the load balancing required to shift whichever devices 101-105 are roaming into different wireless networks 130-132 to balance the roaming load. In other examples, roaming management computer system 150 may determine the load balancing requirements based on application utilization for a plurality of applications on the wireless networks 130-132. For example, the plurality of applications could comprise voice calls, short message service messages, and web browsing, and roaming management computer system 150 could determine load balancing requirements to balance the load associated with a particular application.

After determining the load balancing requirements, roaming management computer system 150 processes the load balancing requirements to generate preferred roaming lists for wireless communication devices 101-105 roaming in the wireless networks 130-132 (204). Typically, the preferred roaming lists are generated for each of the wireless communication devices 101-105 and provide a prioritized list of wireless networks 130-132 for a device 101-105 to attempt connecting to while roaming. The priority of the wireless networks 130-132 in the preferred roaming lists could be different for each of the wireless communication devices 101-105 depending on the load balance requirements and/or other criteria such as a cost of roaming in each of the wireless networks 130-132. Roaming management computer system 150 typically generates the preferred roaming lists in an effort to satisfy the load balancing requirements. In some examples, roaming management computer system 150 processes the load balancing requirements to generate preferred roaming lists for wireless communication devices 101-105 that do not include one or more of the wireless networks 130-132. In addition, roaming management computer system 150 could generate a preferred roaming list for a wireless communication device 101-105 that includes no wireless networks 130-132, which would effectively prohibit the device 101-105 that receives the list from roaming.

After the preferred roaming lists are generated, roaming management computer system 150 transfers the preferred roaming lists for delivery to the wireless communication devices 101-105 (205). Roaming management computer system 150 typically transfers the preferred roaming lists for wireless delivery over-the-air (OTA) to each of the wireless communication devices 101-105. Advantageously, roaming management computer system 150 can control roaming through the preferred roaming lists transferred for delivery to wireless communication devices 101-105. By processing the loading thresholds and usage information for each of the wireless networks 130-132, roaming management computer system 150 can determine load balancing requirements that help ensure the loading thresholds are not exceeded. In this manner, wireless communication devices 101-105 will receive preferred roaming lists specifically designed for each device 101-105 to satisfy the load balancing requirements.

Referring back to FIG. 1, wireless communication devices 101-105 each comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101-105 may also include a user interface, memory device, software, processing circuitry, or some other communication components. For example, each wireless communication device 101-105 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-105 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101-105 and wireless access nodes 120-122.

Wireless access nodes 120-122 each comprise RF communication circuitry and an antenna. The RF communication circuitry typically includes an amplifier, filter, RF modulator, and signal processing circuitry. Each wireless access node 120-122 may also comprise a router, server, memory device, software, processing circuitry, cabling, power supply, network communication interface, structural support, or some other communication apparatus. Wireless access nodes 120-122 could comprise a base station, Internet access node, telephony service node, wireless data access point, or some other wireless communication system—including combinations thereof. Some examples of wireless access nodes 120-122 include a base transceiver station (BTS), base station controller (BSC), radio base station (RBS), Node B, enhanced Node B (eNode B), and others. Wireless network protocols that may be utilized by wireless access nodes 120-122 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless communication networks 130-132 each comprise the core network of a wireless communication provider, and could include routers, gateways, telecommunication switches, servers, processing systems, or other communication equipment and systems for providing communication and data services. Wireless communication networks 130-132 could comprise wireless communication nodes, telephony switches, Internet routers, network gateways, computer systems, communication links, or some other type of communication equipment—including combinations thereof. Wireless communication networks 130-132 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Wireless communication networks 130-132 may be configured to communicate over metallic, wireless, or optical links. Wireless communication networks 130-132 may be configured to use time-division multiplexing (TDM), Internet Protocol (IP), Ethernet, optical networking, wireless protocols, communication signaling, or some other communication format—including combinations thereof. In some examples, wireless communication networks 130-132 include further access nodes and associated equipment for providing communication services to many wireless communication devices across a large geographic region.

Roaming management computer system 150 comprises a processing system and communication interface. Roaming management computer system 150 may also include other components such as a router, server, data storage system, and power supply. Roaming management computer system 150 may reside in a single device or may be distributed across multiple devices. Roaming management computer system 150 may be a discrete system or may be integrated within other systems—including other systems within communication system 100. Roaming management computer system 150 could comprise a packet gateway, mobile switching center, network gateway system, Internet access node, application server, service node, firewall, or some other communication system—including combinations thereof.

Wireless communication links 110-114 use the air or space as the transport medium. Wireless communication links 110-114 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 110-114 may comprise many different signals sharing the same link. For example, each wireless communication link 110-114 could include multiple signals operating in a single propagation path comprising multiple communication sessions, frequencies, timeslots, transportation ports, logical transportation links, network sockets, IP sockets, packets, or communication directions—including combinations thereof.

Communication links 115-119 and 151 use metal, air, space, optical fiber such as glass or plastic, or some other material as the transport media—including combinations thereof. Communication links 115-119 and 151 could use various communication protocols, such as TDM, IP, Ethernet, telephony, optical networking, hybrid fiber coax (HFC), communication signaling, wireless protocols, or some other communication format—including combinations thereof. Communication links 115-119 and 151 may be direct links or could include intermediate networks, systems, or devices.

Figure 3:
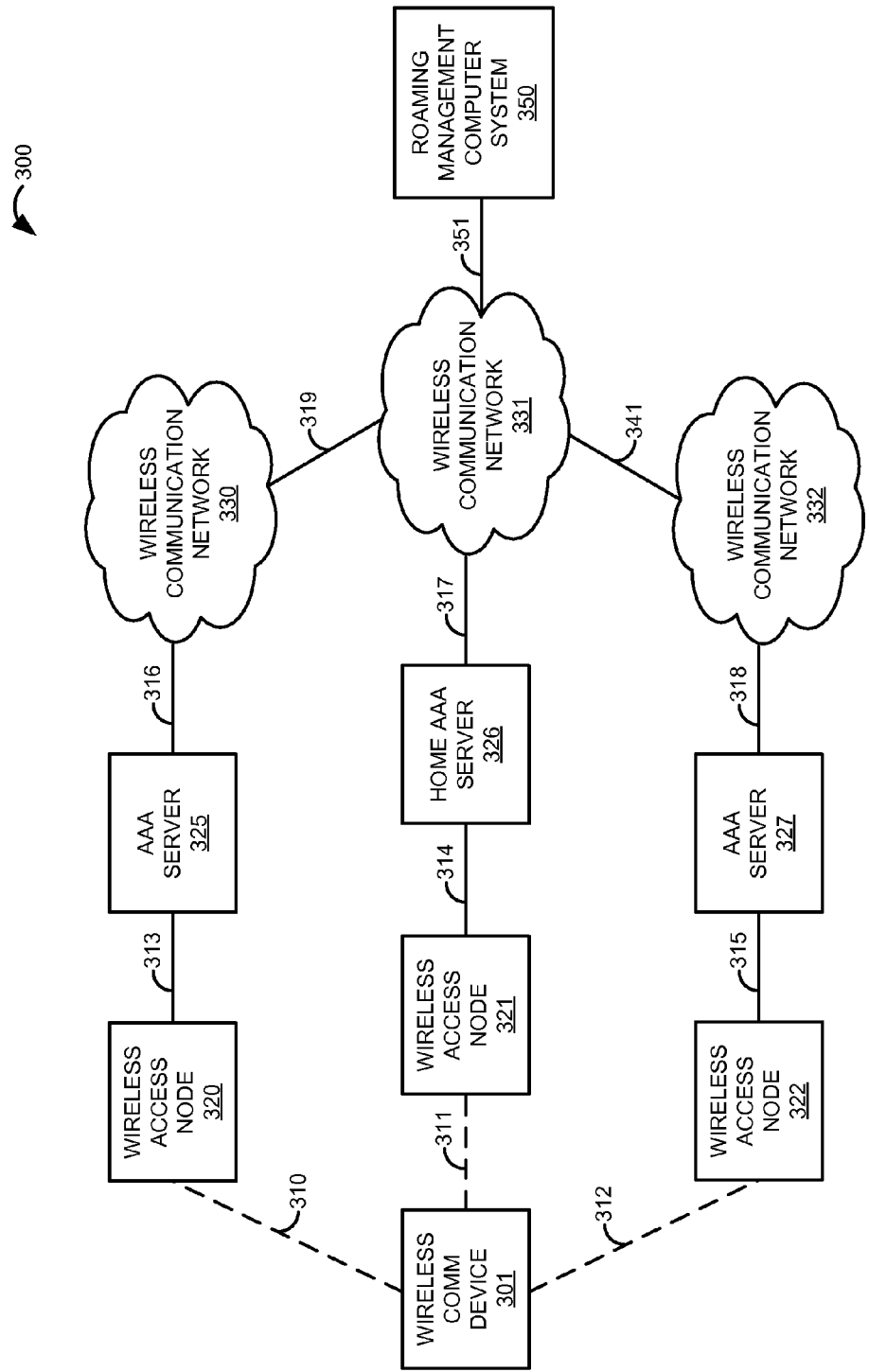
FIG. 3 is a block diagram that illustrates a communication system in an exemplary embodiment.

FIG. 3 is a block diagram that illustrates communication system 300. Communication system 300 includes wireless communication device 301, wireless access nodes 320-322, Authentication, Authorization, and Accounting (AAA) servers 325-327, wireless communication networks 330-332, and roaming management computer system 350. Wireless communication device 301 communicates with wireless access nodes 320-322 over respective wireless links 310-312. Note that although FIG. 3 shows wireless communication device 301 in communication with each wireless access node 320-322, wireless communication device 301 typically communicates with only one wireless access node 320-322 (and establishes only one respective wireless link 310-312) at a given time. Wireless access nodes 320-322 are in communication with respective AAA servers 325-327 over respective communication links 313-315. AAA servers 325-327 communicate with respective wireless communication networks 330-332 over respective communication links 316-318. Wireless communication network 330 is in communication with wireless communication network 331 over communication link 319, while wireless communication network 332 communicates with wireless communication network 331 over communication link 341. Wireless communication network 331 is in communication with roaming management computer system 350 over communication link 351. In FIG. 3, wireless communication device 301 is homed to wireless communication network 331 and associated with home AAA server 326.

Figure 4:
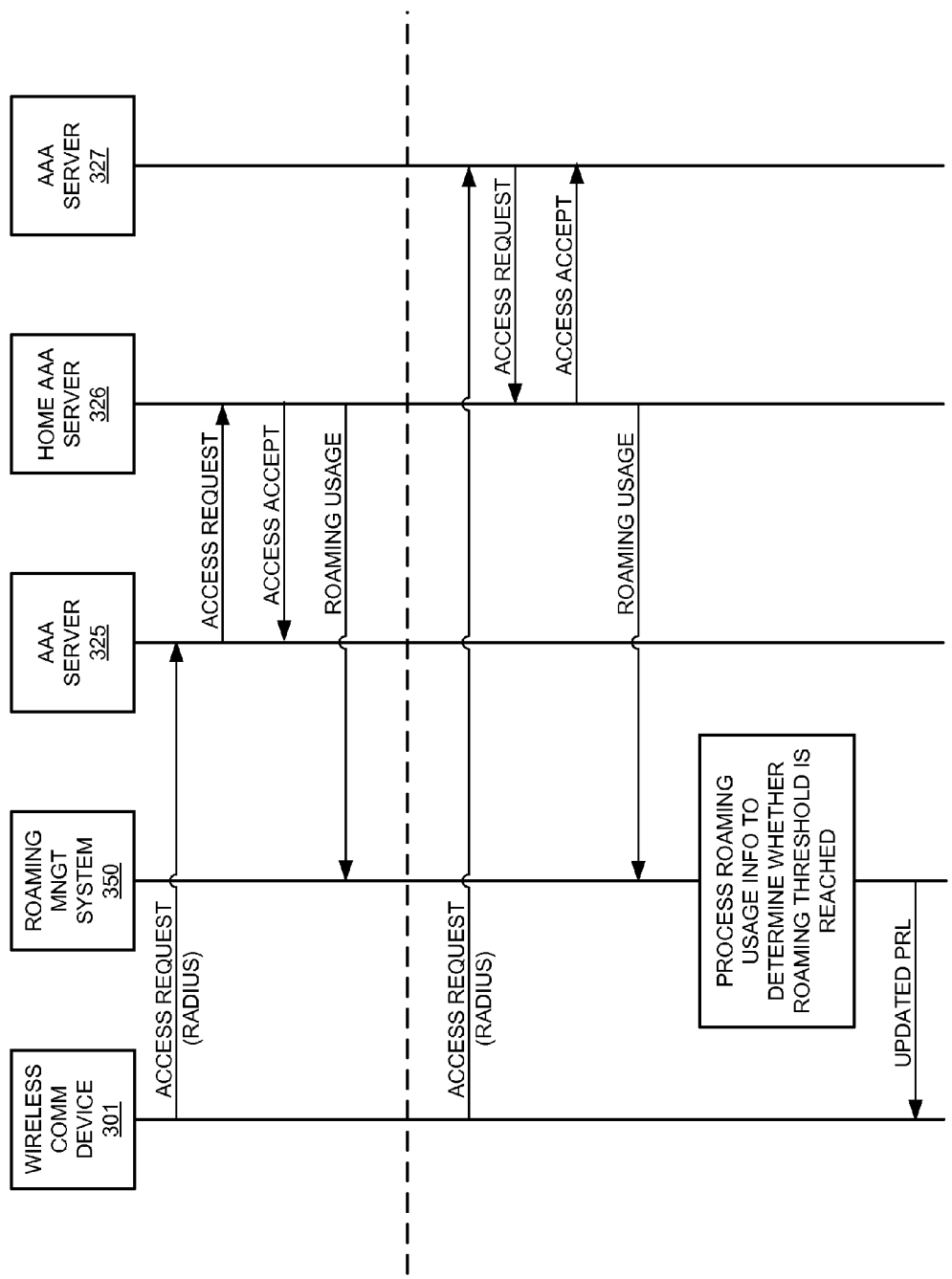
FIG. 4 is a sequence diagram that illustrates an operation of the communication system in an exemplary embodiment.

FIG. 4 is a sequence diagram that illustrates an operation of communication system 300 in an exemplary embodiment. In this example, a user of wireless communication device 301 has subscribed to a wireless communication service with wireless communication network 331. As part of the service agreement, the amount of roaming is limited for wireless communication device 301 by a roaming threshold. Thus, in this example, there are restrictions in place on wireless communication device 301 from utilizing visited wireless networks 330 and 332. These restrictions, or roaming thresholds, could be based on any measurable usage of wireless networks 330 and 332 by wireless communication device 301, but some examples include a duration of time spent connected to visited wireless network 330 and 332, an amount of bandwidth consumed or bytes transferred, a number of short message service (SMS) text messages sent and received, or any other utilization of visited wireless networks 330 and 332 by wireless communication device 301—including combinations thereof. In some examples, wireless communication device 301 could have multiple roaming thresholds, including ones for each visited wireless network 330 and 332, and/or for different measurements of roaming.

Referring now to FIG. 4, wireless communication device 301 is roaming in a geographic area served by wireless communication network 330. In order to gain access to a communication network, an access request for wireless communication device 301 is transferred for delivery to AAA server 325 in a RADIUS Access-Request message. In this example, wireless communication device 301 requests access via wireless access node 320, which could utilize service nodes, gateways, and other communication systems (not shown) to transfer the Access-Request to AAA server 325.

AAA server 325 receives the Access-Request message for wireless communication device 301. The access request typically includes access credentials, security tokens, device and/or subscriber identifiers, or other information associated with wireless communication device 301. Based on the information indicated in the Access-Request, visited AAA server 325 proxies the Access-Request to the home AAA server 326 for device 301.

Upon receiving the proxied Access-Request message from visited AAA server 325, home AAA server 326 processes the access credentials and other information included in the Access-Request message to authenticate the user of wireless communication device 301 and authorize the user for access to a communication network, such as an internet (not shown). Upon successful authentication of the user, home AAA server 326 transfers a RADIUS Access-Accept message to visited AAA server 325.

Prior to, during, and/or after authenticating wireless communication device 301, home AAA server 325 transfers roaming usage information for device 301 to roaming management computer system 350. Typically, the roaming usage data comprises an amount of roaming by wireless communication device 301 in one of the wireless networks 330 or 332. The roaming usage information could comprise any data associated with wireless communication device 301 when roaming in a visited wireless network 330 and 332, including timestamps, bandwidth utilization, amount of data or SMS messages transferred, or any other metric indicating usage of visited wireless networks 330 and 332. In FIG. 4, home AAA server 326 transfers roaming usage information indicating the duration that wireless communication device 301 is roaming in visited wireless network 330.

In response to receiving the roaming usage information from home AAA server 326, roaming management computer system 350 processes the roaming usage information to determine whether wireless communication device 301 has reached a roaming threshold. In some examples, home AAA server 326 acquires the roaming threshold for wireless communication device 301 from back office systems upon device 301 establishing or altering a service plan. In some examples, roaming management computer system 350 could determine whether an amount of roaming by wireless communication device 301 in a single wireless network 330 has reached a threshold roaming level for that one wireless network 330. In this example, however, the roaming threshold comprises a global roaming threshold that limits wireless communication device 301 from roaming in excess of a certain amount across all visited wireless networks 330 and 332. Therefore, in this case, roaming management computer system 350 determines that the roaming usage information for wireless communication device 301 indicates that device 301 has not yet reached its roaming threshold, so device 301 is permitted to roam and no further action is taken by roaming management computer system 350 at this time.

At a later point in time (as indicated by the dashed horizontal line across FIG. 4), another access request for wireless communication device 301 is transferred, this time for delivery to AAA server 327 associated with visited wireless network 332. AAA server 327 receives the Access-Request message for wireless communication device 301 in the RADIUS protocol. Based on the information included in the Access-Request, visited AAA server 327 proxies the Access-Request to the home AAA server 326 for device 301.

Upon receiving the proxied Access-Request message from visited AAA server 325, home AAA server 326 processes the access credentials and other information contained in the Access-Request message to authenticate and authorize the user of wireless communication device 301. Upon successful authentication, home AAA server 326 transfers a RADIUS Access-Accept message to visited AAA server 325.

In addition to authenticating wireless communication device 301, home AAA server 327 transfers roaming usage information for device 301 to roaming management computer system 350. In this example, home AAA server 327 transfers roaming usage information indicating the duration that wireless communication device 301 is roaming in visited wireless network 332. In some examples, home AAA server 326 continues to update the roaming usage information by periodically transferring updated roaming usage information to roaming management computer system 350.

Roaming management computer system 350 processes the roaming usage information to determine whether wireless communication device 301 has reached a roaming threshold. As discussed above, in this example the roaming threshold comprises a global roaming threshold that limits a total amount of roaming by wireless communication device 301 across all visited wireless networks 330 and 332. In this case, based on the roaming usage information, roaming management computer system 350 determines that the roaming threshold for wireless communication device 301 has been reached. Thus, roaming management computer system 350 transfers an updated preferred roaming list for delivery to wireless communication device 301. In this example, the updated preferred roaming list does not include any of the visited wireless networks 330 and 332. Therefore, the updated preferred roaming list for wireless communication device 301 forces device 301 to connect to its home wireless network 331 and effectively prohibits device 301 from roaming in any visited wireless networks 330 or 332. Advantageously, home wireless network 331 can utilize roaming management computer system 350 to control and limit roaming by wireless communication device 301.

In some examples, roaming management computer system 350 notifies the user of device 301 of the excessive roaming either prior to, during, or after transferring the updated preferred roaming list for delivery to wireless communication device 301. For example, roaming management computer system 350 may transfer an SMS text message, email, voicemail, or some other message for delivery to wireless communication device 301 to inform the user of the roaming threshold event. Additionally, in some examples, roaming management computer system 350 may determine at a future time that roaming is again allowable for wireless communication device 301. In this case, roaming management computer system 350 may transfer a new preferred roaming list to wireless communication device 301 that includes at least one visited wireless network 330 or 332 in which device 301 is permitted to roam. For example, the user of wireless communication device 301 may upgrade a service plan associated with device 301 that allows for more roaming, purchase or request additional roaming privileges to increase the roaming threshold, or roaming may again be permitted at the start of a new billing period for device 301. In this manner, roaming management computer system 350 enforces roaming thresholds for wireless communication device 301 based on real-time roaming usage information by specifying in the preferred roaming list for device 301 which visited wireless networks 330 and 332 are approved for roaming, if at all.

Figure 5:
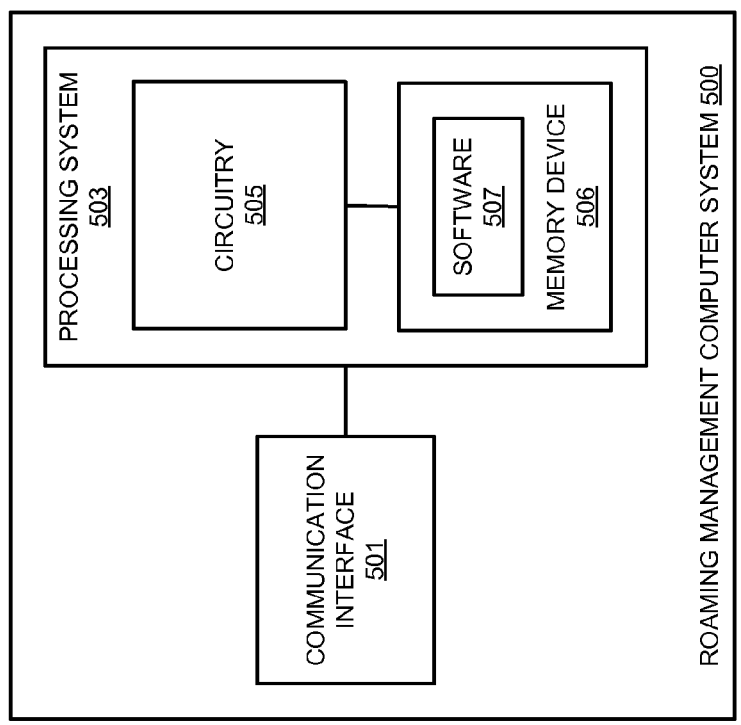
FIG. 5 is a block diagram that illustrates a roaming management computer system.

FIG. 5 is a block diagram that illustrates roaming management computer system 500. Roaming management computer system 500 provides an example of roaming management computer systems 150 and 350, although systems 150 and 350 may use alternative configurations. Roaming management computer system 500 comprises communication interface 501 and processing system 503. Processing system 503 is linked to communication interface 501. Processing system 503 includes processing circuitry 505 and memory device 506 that stores operating software 507.

Communication interface 501 comprises components that communicate over communication links, such as network cards, ports, RF transceivers, processing circuitry and software, or some other communication components. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 could be configured to receive loading thresholds and usage information for each of a plurality of different wireless networks, and transfer preferred roaming lists for delivery to wireless communication devices.

Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software.

When executed by circuitry 505, operating software 507 directs processing system 503 to operate as described herein for roaming management computer systems 150 and 350. In particular, operating software 507 directs processing system 503 to process loading thresholds and usage information to determine load balancing requirements for a plurality of wireless networks, and process the load balancing requirements to generate preferred roaming lists for wireless communication devices roaming in the wireless networks. In addition, operating software 507 may direct processing system 503 to direct communication interface 501 to receive loading thresholds and usage information for each of the wireless networks and transfer the preferred roaming lists for delivery to the wireless communication devices. In some examples, operating software 507 could comprise a load balancing module that processes the loading thresholds and the usage information to determine load balancing requirements for the wireless networks, and a preferred roaming list (PRL) updating module that processes the load balancing requirements to generate preferred roaming lists for wireless communication devices roaming in the wireless networks, and transfers the preferred roaming lists for delivery to the wireless communication devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a roaming management computer system for a plurality of different wireless networks, the method comprising:

receiving loading thresholds for each of the wireless networks;

receiving usage information for each of the wireless networks;

processing the loading thresholds and the usage information to determine load balancing requirements for the wireless networks;

processing the load balancing requirements to generate preferred roaming lists for wireless communication devices roaming in the wireless networks;

transferring the preferred roaming lists for delivery to the wireless communication devices;

determining whether individual ones of the wireless communication devices have reached a roaming threshold; and if the individual ones of the wireless communication devices have reached the roaming threshold, transferring updated preferred roaming lists for delivery to the individual ones of the wireless communication devices.

2. The method of claim 1 further comprising:

receiving roaming usage information for the individual ones of the wireless communication devices roaming in the wireless networks, wherein the roaming usage information comprises amounts of utilization of each of the wireless networks by the individual ones of the wireless communication devices; and wherein determining whether the individual ones of the wireless communication devices have reached the roaming threshold comprises processing the roaming usage information to determine whether the individual ones of the wireless communication devices have reached the roaming threshold.

3. The method of claim 1 wherein the updated preferred roaming lists do not include any of the plurality of different wireless networks.

4. The method of claim 2 wherein processing the roaming usage information to determine whether the individual ones of the wireless communication devices have reached the roaming threshold comprises determining whether the individual ones of the wireless communication devices have reached a threshold roaming level for one of the wireless networks.

5. The method of claim 4 wherein the updated preferred roaming lists do not include the one of the wireless networks if the individual ones of the wireless communication devices have reached the threshold roaming level for the one of the wireless networks.

6. The method of claim 1 wherein processing the loading thresholds and the usage information to determine load balancing requirements for the wireless networks comprises determining the load balancing requirements based on a number of the wireless communication devices roaming in the wireless networks.

7. The method of claim 1 wherein processing the loading thresholds and the usage information to determine load balancing requirements for the wireless networks comprises determining the load balancing requirements based on bandwidth utilization levels on each of the wireless networks.

8. The method of claim 1 wherein processing the loading thresholds and the usage information to determine load balancing requirements for the wireless networks comprises determining the load balancing requirements based on application utilization for a plurality of applications on the wireless networks.

9. The method of claim 8 wherein the plurality of applications comprise voice calls, short message service messages, and web browsing.

10. The method of claim 1 wherein the usage information comprises an amount of utilization of each of the wireless networks.

11. A roaming management computer system comprising:
a communication interface configured to receive loading thresholds and usage information for each of a plurality of different wireless networks; and
a processing system configured to process the loading thresholds and the usage information to determine load balancing requirements for the wireless networks, and process the load balancing requirements to generate preferred roaming lists for wireless communication devices roaming in the wireless networks;
the communication interface configured to transfer the preferred roaming lists for delivery to the wireless communication devices;
the processing system configured to determine whether individual ones of the wireless communication devices have reached a roaming threshold; and
the communication interface configured to, if individual ones of the wireless communication devices reach a roaming threshold, transfer updated preferred roaming lists for delivery to the individual ones of the wireless communication devices.

12. The system of claim 11 further comprising:
the communication interface configured to receive roaming usage information for the individual ones of the wireless communication devices roaming in the wireless networks, wherein the roaming usage information comprises amounts of utilization of each of the wireless networks by the individual ones of the wireless communication devices; and
wherein the processing system configured to determine whether the individual ones of the wireless communication devices have reached the roaming threshold comprises the processing system configured to process the roaming usage information to determine whether the individual ones of the wireless communication devices have reached the roaming threshold.

13. The system of claim 11 wherein the updated preferred roaming lists do not include any of the plurality of different wireless networks.

14. The system of claim 12 wherein processing the roaming usage information to determine whether the individual ones of the wireless communication devices have reached the roaming threshold comprises determining whether the individual ones of the wireless communication devices have reached a threshold roaming level for one of the wireless networks.

15. The system of claim 14 wherein the updated preferred roaming lists do not include the one of the wireless networks if the individual ones of the wireless communication devices have reached the threshold roaming level for the one of the wireless networks.

16. The system of claim 11 wherein processing the loading thresholds and the usage information to determine load balancing requirements for the wireless networks comprises determining the load balancing requirements based on a number of the wireless communication devices roaming in the wireless networks.

17. The system of claim 11 wherein processing the loading thresholds and the usage information to determine load balancing requirements for the wireless networks comprises determining the load balancing requirements based on bandwidth utilization levels on each of the wireless networks.

18. The system of claim 11 wherein processing the loading thresholds and the usage information to determine load balancing requirements for the wireless networks comprises determining the load balancing requirements based on application utilization for a plurality of applications on the wireless networks.

19. The system of claim 11 wherein the usage information comprises an amount of utilization of each of the wireless networks.

20. A method of operating a roaming management computer system for a plurality of different wireless networks, the method comprising:
receiving loading thresholds for each of the wireless networks;
receiving usage information for each of the wireless networks, wherein the usage information comprises an amount of utilization of each of the wireless networks;
processing the loading thresholds and the usage information to determine load balancing requirements for the wireless networks;
processing the load balancing requirements to generate preferred roaming lists for wireless communication devices roaming in the wireless networks;
transferring the preferred roaming lists for delivery to the wireless communication devices;
receiving roaming usage information for individual ones of the wireless communication devices roaming in the wireless networks, wherein the roaming usage information comprises amounts of utilization of each of the wireless networks by the individual ones of the wireless communication devices;

processing the roaming usage information to determine whether the individual ones of the wireless communication devices have reached a roaming threshold; and if the individual ones of the wireless communication devices have reached the roaming threshold, transferring updated preferred roaming lists for delivery to the individual ones of the wireless communication devices.

* * * * *